United States Patent
Tabata et al.

(10) Patent No.: US 8,372,562 B2
(45) Date of Patent: Feb. 12, 2013

(54) CONDUCTIVE CARBON CARRIER FOR FUEL CELL, ELECTRODE CATALYST FOR FUEL CELL AND SOLID POLYMER FUEL CELL COMPRISING SAME

(75) Inventors: Toshiharu Tabata, Kakegawa (JP); Tomoaki Terada, Kakegawa (JP); Takahiro Nagata, Kakegawa (JP); Susumu Enomoto, Kakegawa (JP); Yosuke Horiuchi, Kakegawa (JP); Hiroaki Takahashi, Toyota (JP); Tetsuo Kawamura, South Windsor, CT (US); Hideyasu Kawai, Toyota (JP)

(73) Assignees: Cataler Corporation, Shizuoka (JP); Toyota Jidosha Kabushiki Kaisha, Aichi (JP)

( * ) Notice: Subject to any disclaimer, the term of this patent is extended or adjusted under 35 U.S.C. 154(b) by 587 days.

(21) Appl. No.: 12/225,535

(22) PCT Filed: Mar. 29, 2007

(86) PCT No.: PCT/JP2007/057628
§ 371 (c)(1),
(2), (4) Date: Sep. 24, 2008

(87) PCT Pub. No.: WO2007/116924
PCT Pub. Date: Oct. 18, 2007

(65) Prior Publication Data
US 2009/0169974 A1    Jul. 2, 2009

(30) Foreign Application Priority Data
Mar. 29, 2006  (JP) .................................. 2006-092319

(51) Int. Cl.
*H01M 4/02*   (2006.01)
*H01M 4/36*   (2006.01)
*H01M 4/86*   (2006.01)
*H01M 4/96*   (2006.01)
*H01M 4/92*   (2006.01)

(52) U.S. Cl. .................. 429/531; 429/524; 429/530

(58) Field of Classification Search .................. 429/531, 429/524, 530
See application file for complete search history.

(56) References Cited

U.S. PATENT DOCUMENTS

| | | | |
|---|---|---|---|
| 4,725,422 A | | 2/1988 | Miyabayashi et al. |
| 5,783,325 A | * | 7/1998 | Cabasso et al. ............... 429/524 |
| 6,899,970 B1 | * | 5/2005 | Rogers et al. ................. 429/484 |

FOREIGN PATENT DOCUMENTS

| | | |
|---|---|---|
| CN | 1082071 C | 4/2002 |
| EP | 1 059 685 A2 | 12/2000 |
| JP | A-09-231984 | 9/1997 |
| JP | A-2000-268828 | 9/2000 |
| JP | A-2001-357857 | 12/2001 |
| JP | A-2003-036859 | 2/2003 |
| JP | A-2003-292316 | 10/2003 |
| JP | A-2005-129457 | 5/2005 |
| JP | A-2005-174834 | 6/2005 |
| JP | A-2005-216772 | 8/2005 |
| JP | A-2006-008472 | 1/2006 |
| WO | WO 97/03133 A1 | 1/1997 |
| WO | WO 01/92151 A1 | 12/2001 |

OTHER PUBLICATIONS

Office Action in Chinese Patent Application No. 200780011337.0 dated Apr. 13, 2010 (with English translation).
European Search Report issued in European Patent Application No. 07 74 1064; Oct. 22, 2009.

* cited by examiner

Primary Examiner — Patrick Ryan
Assistant Examiner — Julian Anthony
(74) Attorney, Agent, or Firm — Oliff & Berridge, PLC

(57) ABSTRACT

A conductive carbon carrier for a fuel cell having at least a surface layer graphitized, characterized in that the dimension (La) in a six-membered ring face (carbon plane) direction of a crystallite measured by X-ray diffraction is 4.5 nm or more. This carbon carrier improves the durability in a fuel cell and enables operation for a long period of time.

8 Claims, 2 Drawing Sheets

CONDUCTIVE CARBON CARRIER FOR FUEL CELL, ELECTRODE CATALYST FOR FUEL CELL AND SOLID POLYMER FUEL CELL COMPRISING SAME

TECHNICAL FIELD

The present invention relates to a conductive carbon carrier for a fuel cell having excellent durability, an electrode catalyst for a fuel cell including the conductive carbon carrier, and a solid polymer fuel cell comprising the electrode catalyst.

BACKGROUND ART

Solid polymer fuel cells having a polymer electrolyte membrane can be easily reduced in size and weight, and are thus expected to be put into practical use as a power source in moving vehicles such as electric automobiles, and compact cogeneration systems. However, solid polymer fuel cells have a comparatively low operating temperature, which makes it difficult to effectively utilize their exhaust heat for auxiliary power and the like. Thus, for practical use of such fuel cells, there is a need for performance capable of obtaining high power generation efficiency and high output density under operating conditions of a high anode reaction gas (pure hydrogen etc.) utilization rate and a high cathode reaction gas (air etc.) utilization rate.

The electrode reactions at the respective catalyst layers of the anode and the cathode of a solid polymer fuel cell proceed at a three-phase boundary (hereinafter, referred to as "reaction site") where the respective reaction gas, catalyst, and fluorinated ion exchange resin (electrolyte) are simultaneously present. Thus, each electrode reaction only proceeds at the three-phase boundary where the gas (hydrogen or oxygen), which is the active material, protons ($H^+$), and electrons ($e^-$) can be simultaneously exchanged among them.

An example of an electrode having such a function is a solid polymer electrolyte-catalyst composite electrode including a solid polymer electrolyte, carbon particles, and a catalyst material. This electrode may be, for example, a porous electrode containing carbon particles supporting the catalyst material and a solid polymer electrolyte which are three-dimensionally distributed in admixture and having a plurality of pores formed thereinside. The carbon supporting the catalyst forms an electron-conductive channel, the solid electrolyte forms a proton-conductive channel, and the pores form a channel for the supply and discharge of oxygen, or the hydrogen and water which is generated as a product. These three channels are three-dimensionally spread throughout the electrode, so that numerous three-phase boundaries which allow the simultaneous exchange of gas, protons ($H^+$), and electrons ($e^-$) are formed, providing electrode reaction sites.

Thus, in a solid polymer fuel cell, a catalyst such as a metal catalyst or a metal-loaded catalyst (e.g., metal-loaded carbon with a metal catalyst such as platinum or the like on a carbon black carrier having a large specific surface area) has been coated with a fluorinated ion exchange resin which is the same as or different from the polymer electrolyte membrane to form a constituent material of the catalyst layer, which has been used to increase the number of reaction sites in the catalyst layer through so-called three-dimensional arrangement of the reaction sites and thereby to utilize more efficiently the expensive precious metal such as platinum, a catalyst metal.

Conventionally, an electrode catalyst on which catalyst metal fine particles of platinum or platinum alloy, which is the active catalyst material, are supported in a highly dispersed state on a conductive carbon carrier having a large specific surface area, such as carbon black, is used for both the anode and the cathode. Supporting fine particles of the catalyst metal in a highly dispersed state increases the electrode reaction area, which increases catalyst performance.

However, because the electrode reaction at the cathode has a large activation energy, an overvoltage is generated across the cathode. As a result, if the cathode is exposed to a noble potential environment of about 1.2 V, the carbon carrier is lost through corrosion to liberate and agglomerate platinum, which has caused the problem that the cell life decreases.

Accordingly, an electrode catalyst was thought of which was produced using a heat-treated carbon powder for the carrier. It is known that carbon powder generally has a structure similar to that of graphite if heat treated at a high temperature of 1,000 or more, whereby corrosion resistance is improved.

As for graphite, it is a hexagonal crystalline substance of carbon and consists of crystallites in a layered structure in which planes of highly developed fused carbon rings lie on one another. Although the carbons in the plane of each layer are linked by strong covalent bonds ($sp^2$ bonds), the respective layers are bonded by weak van der Waals forces. The face on which the edge face of such a carbon fused ring is oriented is called the "edge face", and the face on which the carbon fused ring plane is oriented is called the "basal face".

However, although heat treated carbon powder has improved corrosion resistance, its specific surface area decreases, meaning that platinum cannot be supported in a highly dispersed state. Therefore, an electrode catalyst using a carrier having a graphite structure has the drawback that its activity is lower since it is formed only of a heat treated carbon powder.

Further, since graphite has a developed layer structure, graphite does not easily support the catalyst metal, so that the supported catalyst metal tends to peel off. Thus, in some cases the catalyst component peels off over time through use, and catalyst performance deteriorates. In addition, for a conventional method, catalyst metal particles are more close to one another, and larger particles tend to form by sintering of the catalyst metal.

In view of this, the inventors of Japanese Patent Publication (Kokai) No. 2005-216772 discovered that the basal face and the edge face present in a graphitized carbon have different characteristics; specifically, that although the basal face is energetically stable, the edge face is energetically unstable and is activated. The inventors of that document also discovered that since the catalyst metal tends to be supported more on the edge face, by increasing the number of edge faces, the effective surface area of the carrier can be enlarged, and the catalyst metal utilization rate can be improved. As a result, because the power output generated per unit cell area increases, the cell can be reduced in size, or the requirement of the catalyst or precious metal can be reduced, which contributes to cost reduction.

Such a technique for improving the durability of a supported catalyst by graphitizing a carrier loaded with a catalyst is known. Further, carbon particles as a carrier have been reported in which the average lattice spacing d002 of the [002] face, the dimension Lc (002) in the thickness direction of the crystallites, and the specific surface area are defined in specific ranges, because they provide better water repellency and corrosion resistance for electrode catalyst layers. For example, it is an object of Japanese Patent Publication (Kokai) No. 2001-357857 to obtain a cathode which has high activity in the reduction reaction of oxygen, and excellent water repellency and corrosion resistance, and a solid polymer fuel cell which has excellent output characteristics and driving stability as a result of having such cathode. This document discloses an electrode catalyst in which platinum or a platinum alloy is supported on a carbon carrier having an average lattice spacing d002 of 0.340 to 0.362 nm, a crystallite dimension Lc of 0.6 to 4 nm, and a specific surface area of 260 to 800 m²/g.

DISCLOSURE OF THE INVENTION

However, even if graphitization is advanced simply by defining the crystallite dimension Lc alone, if growth in the six-membered ring direction of the crystallite is low, a large number of edge portions remain. With such edge portions as starting points, degradation of the conductive carbon carrier starts, such as increased hydrophilicity and corrosion of the carbon due to its functionalization. Thus, there is the problem that difficulties arise during prolonged operation of the fuel cell.

The present invention was created in view of the above-described problems in the conventional art, and overcomes the fact that just defining the dimension Lc (002) in the thickness direction of the crystallites and the specific surface area does not resolve the problems. Therefore, the present invention improves the durability in a fuel cell and enables operation for a long period of time.

The present inventors focused on the dimension (La) in the six-membered ring face (carbon plane) direction of the crystallites, rather than on the dimension Lc (002) in the thickness direction of the crystallites. The present inventors discovered that when this is measured by X-ray diffraction, as the dimension (La) in the six-membered ring face (carbon plane) direction increases, the rate of decrease in voltage per unit surface area of the fuel cell also decreases, thereby arriving at an invention of a conductive carbon carrier having a dimension (La) in the six-membered ring face (carbon plane) direction which is a certain value or more, and an electrode catalyst for a fuel cell using this conductive carbon carrier.

Specifically, first, the present invention is an invention of a conductive carbon carrier for a fuel cell having at least a surface layer graphitized, characterized in that the dimension (La) in a six-membered ring face (carbon plane) direction of a crystallite measured by X-ray diffraction is 4.5 nm or more. If La is less than 4.5 nm, the durability for a fuel cell is lacking, and the decrease in voltage after operation for a long period of time is marked. Although the upper limit of La is not especially limited, if La is, for example, more than 15 nm, the specific surface area tends to decrease.

Second, the present invention is an invention of an electrode catalyst for a fuel cell, comprising the above-described conductive carbon carrier having at least a surface layer is graphitized and an active catalyst material, characterized in that the graphitized conductive carbon particles have a dimension (La) in a six-membered ring face (carbon plane) direction of a crystallite measured by X-ray diffraction of 4.5 nm or more. Since the conductive carbon carrier has a large dimension (La) in a six-membered ring face (carbon plane) direction of a graphitic crystallite on the surface, the electrode catalyst for a fuel cell according to the present invention has a smaller proportion of edge portions which act as a starting point for a degradation reaction. As a result, degradation of the conductive carbon carrier, such as increased hydrophilicity and corrosion of the carbon due to its functionalization, can be substantially suppressed.

Metals composed only of a known precious metal as well as alloys composed of a precious metal and another metal may be widely used as the catalyst metal, which is the active catalyst material used in the electrode catalyst for a fuel cell according to the present invention. Among these, preferred examples include platinum or a platinum alloy.

When using platinum or a platinum alloy as the above-described active catalyst material, the platinum mass with respect to the carbon mass is preferably in a range of 0.075 to 2.4, more preferably in a range of 0.075 to 2.0, and even more preferably in a range of 0.1 to 1.5.

If the active catalyst material is a platinum alloy, it is preferably an alloy of one or more metals selected from the group consisting of Fe, Ni, Co, Ir, Rh, Pd, Cr, and Mn, and platinum. Further, examples of added metals other than platinum or a platinum alloy include Ir, Rh, and Pd.

The conductive carbon carrier for a fuel cell according to the present invention preferably has corrosion resistance.

The electrode catalyst for a fuel cell according to the present invention can be used for both the anode and the cathode electrodes. By using as the anode and cathode catalyst, the effect of ensuring the durability of the cell performance can be gained.

Third, the present invention is an invention of a solid polymer fuel cell, comprising an anode, a cathode, and a polymer electrolyte membrane disposed between the anode and the cathode, characterized by comprising the above-described electrode catalyst for a fuel cell as the cathode and/or anode electrode catalyst.

That the electrode catalyst for a fuel cell according to the present invention can be used for both the anode and the cathode electrodes is as described above.

By comprising the electrode catalyst according to the present invention, a solid polymer fuel cell can be produced having excellent durability without a sudden reduction in voltage after operation of, for example, 300 hours as is the case conventionally.

Since the electrode catalyst for a fuel cell according to the present invention has a dimension (La) in a six-membered ring face (carbon plane) direction of a crystallite constituting the graphite of the surface layer of a conductive carbon carrier of 4.5 nm or more, the proportion of edge portions which act as a starting point for a degradation reaction is lower. As a result, degradation of the conductive carbon carrier, such as increased hydrophilicity and corrosion of the carbon due to its functionalization, can be substantially suppressed. According to the present invention, the durability of the fuel cell is improved and operation can be carried out for a long period of time.

BEST MODE FOR CARRYING OUT THE INVENTION

Figure 1:
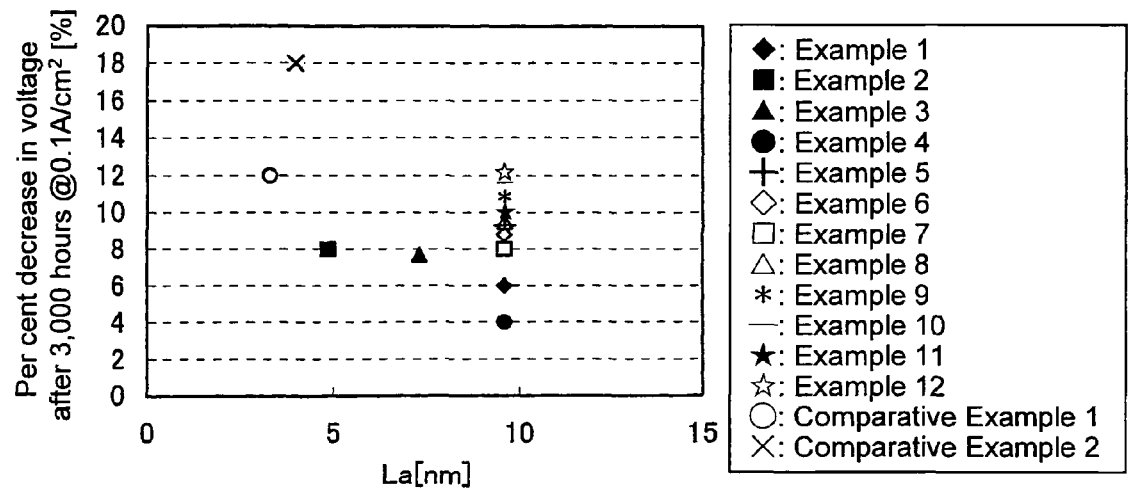
FIG. 1 illustrates the relationship between the dimension (La) in a six-membered ring face (carbon plane) direction of the crystallites and the rate of decrease in voltage after endurance test over 3,000 hours.

Preferable embodiments of the electrode catalyst for a fuel cell and the solid polymer fuel cell comprising this electrode catalyst according to the present invention will now be described in more detail.

Although the metal catalyst contained in the electrode catalyst for a fuel cell according to the present invention is not especially limited, platinum or a platinum alloy is preferred. Further, the metal catalyst is preferably supported on a conductive carrier. Although the material for this conductive carrier is not especially limited, a preferred material is, for example, carbon black, activated carbon or the like.

Further, as the polymer electrolyte used in conjunction with the electrode catalyst for a fuel cell according to the present invention, a fluorinated ion exchange resin is preferred, and a sulfonic acid type perfluorocarbon polymer is especially preferred. A sulfonic acid type perfluorocarbon polymer enables proton conduction in the cathode which is chemically stable over a long period of time and fast.

Further, the layer thickness of the catalyst layer of the electrode catalyst for a fuel cell according to the present invention may be the same as that for a typical gas diffusion electrode, preferred is 1 to 100 μm, and more preferred is 3 to 50 μm.

Further, the polymer electrolyte membrane used in the solid polymer fuel cell according to the present invention is not especially limited so long as it is an ion exchange membrane which exhibits good ion conductivity in a wet state. Examples of the solid polymer material for the polymer electrolyte membrane include a perfluorocarbon polymer having a sulfonic acid group, a polysulfone resin, a perfluorocarbon polymer having a phosphonic acid group or a carboxylic acid group and the like. Among these, a sulfonic acid type perfluorocarbon polymer is preferred. This polymer electrolyte membrane may be composed of the same resin as the fluorinated ion exchange resin contained in the catalyst layer, or may be composed of a different resin.

The electrode catalyst for a fuel cell according to the present invention may be produced, in advance, using a conductive carrier loaded with a metal catalyst and a coating solution in which a polymer electrolyte is dissolved or dispersed in a solvent or a dispersion medium. Alternatively, the electrode catalyst for a fuel cell may be produced using a coating solution in which a catalyst-supported conductive carrier and a polymer electrolyte are dissolved or dispersed in a solvent or a dispersion medium. Here, examples of the solvent or dispersion medium which can be used include alcohols, fluorinated alcohols, and fluorinated ethers. Further, the catalyst layer can be formed by coating the coating solution on carbon cloth or the like which will form the ion exchange membrane or gas diffusion layer. In addition, the catalyst layer may be formed on the ion exchange membrane also by coating the above-described coating solution on a separately-prepared substrate to form a coating layer, and transferring this onto the ion exchange membrane.

Here, when the electrode catalyst layer for a fuel cell is formed on the gas diffusion layer, it is preferred to bond the catalyst layer and the ion exchange membrane together by an adhering method or by hot pressing. Further, when the catalyst layer is formed on the ion exchange membrane, the cathode may be constituted by only the catalyst layer, or the cathode may be constituted also with the gas diffusion layer disposed adjacent to the catalyst layer.

A separator formed with the usual gas channels is provided on the outer side of the cathode. The solid polymer fuel cell is configured so that the gas containing hydrogen is fed to the anode and the gas containing oxygen is fed to the cathode in these channels.

In the present invention, the reason why the durability of the electrode catalyst is improved is thought to be because the dimension (La) in the six-membered ring face (carbon plane) direction of the crystallites constituting the graphite layer of the conductive carbon carrier is large, the proportion of edge portions which act as a starting point for degradation is reduced.

EXAMPLES

The cathode and the solid polymer fuel cell according to the present invention will now be described in more detail with reference to the following examples and comparative examples.

Example 1

The temperature of carbon black having a specific surface area of 760 m$^2$/g was increased to 2,000° C. in an argon gas atmosphere at a rate of temperature increase of 20° C./min. The carbon black was then subjected to a heat treatment for 8 hours to obtain graphitized carbon. As a result of calculating La from the peak in the vicinity of 42° and Lc from the peak in the vicinity of 26° by XRD, La was 9.6 nm and Lc was 5.6 nm. In the following, La and Lc were also measured in the same manner.

0.5 L of pure water was charged into 0.4 g of the graphitized carbon powder obtained by this heat treatment, and the resultant solution was dispersed. A nitric acid solution of hexahydroxoplatinate containing 0.6 g of platinum was added dropwise to this dispersion, and the resultant solution was made well compatible with the carbon. The solution was charged with 0.01 N ammonia to adjust the pH to about 9. Then, a dispersion in which 0.5 g of sodium borohydride as a reducing agent was dissolved in pure water was added dropwise to the solution. The resultant dispersion was filtered and washed. The obtained powder was dried at 80° C. for 48 hours. Measurement by XRD showed that the obtained Pt catalyst had a Pt average particle size of 4.2 nm. Here, Pt/C=1.5.

The obtained catalyst was formed into a membrane, which was then evaluated for its endurance performance in a single cell further including an electrolyte layer and an anode membrane.

Example 2

The temperature of carbon black having a specific surface area of 760 m$^2$/g was increased to 1,400° C. in an argon gas atmosphere at a rate of temperature increase of 20° C./min. The carbon black was then subjected to a heat treatment for 4 hours to obtain graphitized carbon. The results of measuring by XRD were an La of 4.9 nm and an Lc of 1.4 nm.

A Pt catalyst was prepared by the same catalyst preparation method as in Example 1 using the obtained graphitized carbon powder. Measurement by XRD showed that the obtained Pt catalyst had a Pt average particle size of 3.4 nm. Here, Pt/C=1.5.

The obtained catalyst was formed into a membrane, which was then evaluated for its endurance performance in a single cell further including an electrolyte layer and an anode membrane.

Example 3

The temperature of carbon black having a specific surface area of 1,200 m$^2$/g was increased to 1,700° C. in an argon gas atmosphere at a rate of temperature increase of 20° C./min. The carbon black was then subjected to a heat treatment for 6 hours to obtain graphitized carbon. The results of measuring by XRD were an La of 7.3 nm and an Lc of 3.4 nm.

A Pt catalyst was prepared by the same catalyst preparation method as in Example 1 using the obtained graphitized carbon powder. Measurement by XRD showed that the obtained Pt catalyst had a Pt average particle size of 3.2 mm. Here, Pt/C=1.5.

The obtained catalyst was formed into a membrane, which was then evaluated for its endurance performance in a single cell further including an electrolyte layer and an anode membrane.

Example 4

PtCo Catalyst Preparation Method 3.9 g of graphitized carbon powder obtained by the same method as in Example 1 was charged into 0.5 L of pure water and dispersed. A nitric acid solution of hexahydroxoplatinate containing 5.89 g of platinum, and an aqueous solution of cobalt nitrate containing 0.3 g of cobalt were added dropwise in that order to this dispersion, and the resultant solution was made well compatible with the carbon. The solution was charged with about 5 mL of 0.01 N ammonia to adjust the pH to about 9 to cause each of the hydroxides to deposit on the formed carbon. This dispersion was then repeatedly filtered and washed. The obtained powder was dried at 100° C. for 10 hours. Next, the powder was subjected to a reducing treatment by holding for 2 hours at 500° C. in hydrogen gas. The resultant product was then formed into an alloy by holding for 2 hours at 900° C. in nitrogen gas. Further, this catalyst powder was stirred in 0.5 L of 1 N hydrochloric acid to remove by acid cleaning about 40 wt. % of the non-alloyed cobalt, and then repeatedly washed with pure water.

When the obtained Pt catalyst was measured by XRD, only a Pt peak was observed, and the formation of a disordered alloy was confirmed from the peak shift of the Pt (111) face in the vicinity of 39°.

Further, the average particle size was calculated from the peak position of the Pt (111) face and the half value width to be 5.6 nm. Here, Pt/C=1.5.

Example 5

A catalyst was prepared using the graphitized carbon powder used in Example 1.

0.5 L of pure water was charged into 0.92 g of the graphitized carbon powder, and the resultant solution was dispersed. A nitric acid solution of hexahydroxoplatinate containing 0.08 g of platinum was added dropwise to this dispersion, and the resultant solution was made well compatible with the carbon. The solution was charged with 0.01 N ammonia to adjust the pH to about 9. Then, a dispersion in which 0.5 g of sodium borohydride as a reducing agent was dissolved in pure water was added dropwise to the solution. The resultant dispersion was filtered and washed. The obtained powder was dried at 80° C. for 48 hours.

Measurement by XRD showed that the obtained Pt catalyst had a Pt average particle size of 2.3 nm. The obtained catalyst was formed into a membrane, which was then evaluated for its endurance performance in a single cell further including an electrolyte layer and an anode membrane.

Example 6

A catalyst was prepared using the graphitized carbon powder used in Example 1.

0.5 L of pure water was charged into 0.9 g of the graphitized carbon powder, and the resultant solution was dispersed. A nitric acid solution of hexahydroxoplatinate containing 0.1 g of platinum was added dropwise to this dispersion, and the resultant solution was made well compatible with the carbon. The solution was charged with 0.01 N ammonia to adjust the pH to about 9. Then, a dispersion in which 0.5 g of sodium borohydride as a reducing agent was dissolved in pure water was added dropwise to the solution. The resultant dispersion was filtered and washed. The obtained powder was dried at 80° C. for 48 hours.

Measurement by XRD showed that the obtained Pt catalyst had a Pt average particle size of 2.6 nm. The obtained catalyst was formed into a membrane, which was then evaluated for its endurance performance in a single cell further including an electrolyte layer and an anode membrane.

Example 7

A catalyst was prepared using the graphitized carbon powder used in Example 1. 0.5 L of pure water was charged into 0.32 g of the graphitized carbon powder, and the resultant solution was dispersed. A nitric acid solution of hexahydroxoplatinate containing 0.68 g of platinum was added dropwise to this dispersion, and the resultant solution was made well compatible with the carbon. The solution was charged with 0.01 N ammonia to adjust the pH to about 9. Then, a dispersion in which 0.5 g of sodium borohydride as a reducing agent was dissolved in pure water was added dropwise to the solution. The resultant dispersion was filtered and washed. The obtained powder was dried at 80° C. for 48 hours.

Measurement by XRD showed that the obtained Pt catalyst had a Pt average particle size of 4.8 nm. The obtained catalyst was formed into a membrane, which was then evaluated for its endurance performance in a single cell further including an electrolyte layer and an anode membrane.

Example 8

A catalyst was prepared using the graphitized carbon powder used in Example 1.

0.5 L of pure water was charged into 0.3 g of the graphitized carbon powder, and the resultant solution was dispersed. A nitric acid solution of hexahydroxoplatinate containing 0.7 g of platinum was added dropwise to this dispersion, and the resultant solution was made well compatible with the carbon. The solution was charged with 0.01 N ammonia to adjust the pH to about 9. Then, a dispersion in which 0.5 g of sodium borohydride as a reducing agent was dissolved in pure water was added dropwise to the solution. The resultant dispersion was filtered and washed. The obtained powder was dried at 80° C. for 48 hours.

Measurement by XRD showed that the obtained Pt catalyst had a Pt average particle size of 5.1 nm. The obtained catalyst was formed into a membrane, which was then evaluated for its endurance performance in a single cell further including an electrolyte layer and an anode membrane.

Example 9

Example 9 was carried out in the same manner as in Example 1, except that the graphitized carbon powder was 0.95 g and the platinum was 0.05 g.

Example 10

Example 10 was carried out in the same manner as in Example 1, except that the graphitized carbon powder was 0.28 g and the platinum was 0.72 g.

Example 11

Example 11 was carried out in the same manner as in Example 1, except that platinum/graphitized carbon powder=4.0.

Example 12

Example 12 was carried out in the same manner as in Example 1, except that platinum/graphitized carbon powder=4.5.

Comparative Example 1

The temperature of carbon black having a specific surface area of 1,200 m²/g was increased to 1,300° C. in an argon gas atmosphere at a rate of temperature increase of 5° C./min. The carbon black was then subjected to a heat treatment for 6 hours to obtain graphitized carbon. The results of measuring by XRD were an La of 3.3 nm and an Lc of 2.4 nm.

A Pt catalyst was prepared by the same catalyst preparation method as in Example 1 using the obtained graphitized carbon powder. Measurement by XRD showed that the obtained Pt catalyst had a Pt average particle size of 2.1 nm. Here, Pt/C=1.5.

The obtained catalyst was formed into a membrane, which was then evaluated for its endurance performance in a single cell further including an electrolyte layer and an anode membrane.

Comparative Example 2

A catalyst was prepared using carbon black as is without a heat treatment for the carrier. The specific surface area of the used carrier was 760 m²/g. La was 4.0 nm and Lc was 0.8 nm.

A Pt catalyst was prepared by the same method as in Example 1. Measurement by XRD showed that the obtained Pt catalyst had a Pt average particle size of 2.3 nm.

The obtained catalyst was formed into a membrane, which was then evaluated for its endurance performance in a single cell further including an electrolyte layer and an anode membrane.

The physical properties of the catalyst powder obtained in each of the examples and comparative examples are collectively shown in the following Table 1.

TABLE 1

|  | La [nm] | Lc [nm] | Pt/C | Particle Size [nm] |
|---|---|---|---|---|
| Example 1 | 9.6 | 5.6 | 1.5 | 4.2 |
| Example 2 | 4.9 | 1.4 | 1.5 | 3.4 |
| Example 3 | 7.3 | 3.4 | 1.5 | 3.2 |
| Example 4 | 9.6 | 5.6 | 1.5 | 5.6 |
| Example 5 | 9.6 | 5.6 | 0.08 | 2.3 |
| Example 6 | 9.6 | 5.6 | 0.1 | 2.6 |
| Example 7 | 9.6 | 5.6 | 2.1 | 4.8 |
| Example 8 | 9.6 | 5.6 | 2.4 | 5.1 |
| Example 9 | 9.6 | 5.6 | 0.05 | 1.9 |
| Example 10 | 9.6 | 5.6 | 2.6 | 5.3 |
| Example 11 | 9.6 | 5.6 | 4.0 | 5.1 |
| Example 12 | 9.6 | 5.6 | 4.5 | 5.3 |
| Comparative Example 1 | 3.3 | 2.3 | 1.5 | 2.1 |
| Comparative Example 2 | 4.0 | 0.8 | 1.5 | 2.3 |

[Endurance Test]

Using the obtained platinum-loaded carbon catalyst powders, single cell electrodes for a solid polymer fuel cell was formed as follows. The platinum-loaded carbon catalyst powders were dispersed in an organic solvent, and the resultant dispersions were coated on Teflon® sheets to form a catalyst layer. The amount of Pt catalyst per 1 cm² of electrode area was 0.4 mg. These electrodes formed from platinum-loaded carbon catalyst powder were laminated by hot pressing with a polymer electrolyte membrane respectively therebetween. A diffusion layer was provided on both sides of the laminated structure to form a single cell electrode. Humidified air which had been passed through a bubbler heated to 70° C. was fed at 1 L/min to the cathode side electrode of the cell, and humidified air which had been passed through a bubbler heated to 85° C. was fed at 0.5 L/min to the anode side electrode of the cell. This operation was continuously carried out at a constant voltage of 0.6 V for 3,000 hours.

Measurements I to V were carried out at each hour, and the effects at those times at a voltage of 0.1 A/cm² were compared.

[Results]

Figure 2:
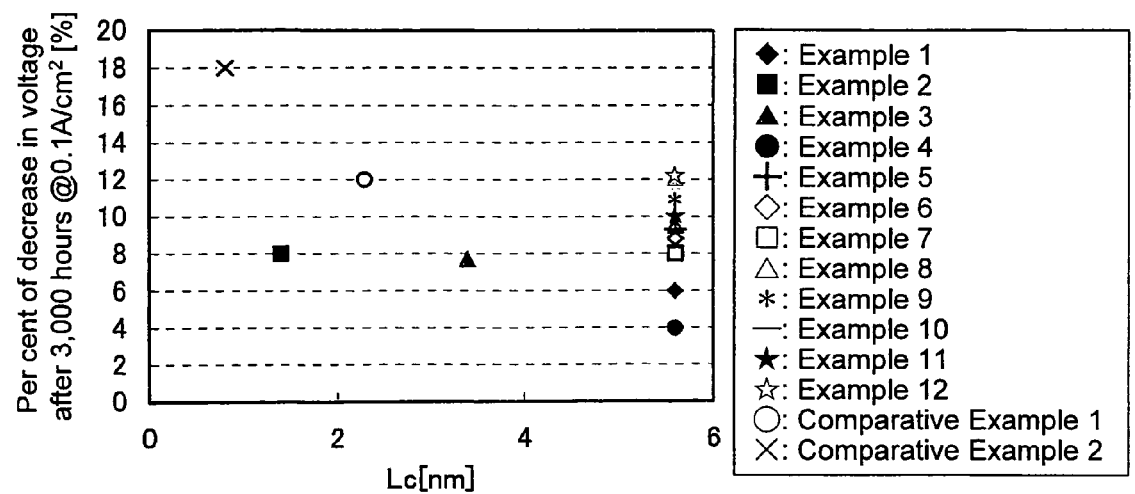
FIG. 2 illustrates the relationship between the dimension (Lc) in a thickness direction (Lc) of the crystallites and the rate of decrease in voltage after endurance test over 3,000 hours.

FIG. 1 illustrates the relationship between the dimension (La) in a six-membered ring face (carbon plane) direction of the crystallites and the rate of decrease in voltage after endurance test over 3,000 hours. FIG. 2 illustrates the relationship between the dimension (Lc) in a thickness direction of the crystallites and the rate of decrease in voltage after endurance test over 3,000 hours.

From the results of FIG. 1, for a conventional carrier (Comparative Examples 1 and 2), whose La is less than 4.5 nm, the rate of decrease in voltage reaches 10% or more. In contrast, for the carrier of the present invention (Examples 1 to 12), whose La is 4.5 nm or more, the rate of decrease in voltage could be suppressed to 10% or less. Moreover, no clear relationship between Lc and the rate of decrease in voltage was found (FIG. 2).

In addition, as illustrated in Examples 4 to 8, by setting the amount of platinum or platinum alloy contained as the active catalyst material to 0.075 to 2.4 based on the carbon mass, the rate of decrease in voltage could be suppressed even further.

The XRD measurement method used in the present invention was as follows.

Apparatus: RINT-2500 (Rigaku)
Target: Cu
Power: 40 kV, 40 mA
La calculated from the position (angle) of the peak in the vicinity of 42° and the half value width
Lc calculated from the position (angle) of the peak in the vicinity of 26° and the half value width

INDUSTRIAL APPLICABILITY

According to the present invention, degradation of a conductive carbon carrier can be substantially suppressed by increasing the dimension (La) in a six-membered ring face (carbon plane) direction of the crystallites constituting the graphite of the surface layer of the conductive carbon carrier. According to the present invention, the durability of a fuel cell is improved, and operation can be carried out for a long period of time. As a result, the present invention contributes to the practical application and spread of fuel cells.

The invention claimed is:
1. An electrode catalyst for a fuel cell, comprising a conductive carbon carrier having a surface layer graphitized and an active catalyst material, wherein:
   the conductive carbon carrier has a dimension (La) in a six-membered ring face (carbon plane) direction of a crystallite measured by X-ray diffraction of 4.5 nm to 15 nm; and the active catalyst material comprises platinum or a platinum alloy, and a ratio of platinum mass with respect to carbon mass is in a range of 1.5 to 2.4.

2. The electrode catalyst for a fuel cell according to claim 1, wherein the platinum alloy is an alloy of one or more metals selected from the group consisting of Fe, Ni, Co, Ir, Rh, Pd, Cr, and Mn, and platinum.

3. A solid polymer fuel cell, comprising:
an anode,
a cathode, and
a polymer electrolyte membrane disposed between the anode and the cathode,
wherein the anode and/or cathode comprises the electrode catalyst for a fuel cell according to claim 2.

4. A solid polymer fuel cell, comprising:
an anode,
a cathode, and
a polymer electrolyte membrane disposed between the anode and the cathode,
wherein the anode and/or cathode comprises the electrode catalyst for a fuel cell according to claim 1.

5. The electrode catalyst for a fuel cell according to claim 1, wherein La is from 4.9 nm to 9.6 nm.

6. The electrode catalyst for a fuel cell according to claim 5, wherein the platinum alloy is an alloy of one or more metals selected from the group consisting of Fe, Ni, Co, Ir, Rh, Pd, Cr, and Mn, and platinum.

7. A solid polymer fuel cell, comprising:
an anode,
a cathode, and
a polymer electrolyte membrane disposed between the anode and the cathode,
wherein the anode and/or cathode comprises the electrode catalyst for a fuel cell according to claim 6.

8. A solid polymer fuel cell, comprising:
an anode,
a cathode, and
a polymer electrolyte membrane disposed between the anode and the cathode,
wherein the anode and/or cathode comprises the electrode catalyst for a fuel cell according to claim 5.

* * * * *